United States Patent [19]

Roberts

[11] Patent Number: 4,896,256

[45] Date of Patent: Jan. 23, 1990

[54] LINKING INTERFACE SYSTEM USING PLURAL CONTROLLABLE BIDIRECTIONAL BUS PORTS FOR INTERCOMMUNICATION AMOUNG SPLIT-BUS INTRACOMMUNICATION SUBSYSTEMS

[75] Inventor: Barry R. Roberts, Lindenhurst, Ill.

[73] Assignee: Kabushiki Kaisha Toshiba, Kanagawa, Japan

[21] Appl. No.: 863,060

[22] Filed: May 14, 1986

[51] Int. Cl.[4] .................. G06F 13/36; G06F 13/40; G06F 13/42; G06F 15/46
[52] U.S. Cl. .................. 364/200; 364/240.2; 364/935.4; 364/935.46; 370/85.12; 360/825
[58] Field of Search ... 364/200 MS File, 900 MS File; 370/87, 88; 360/825.05

[56] References Cited

U.S. PATENT DOCUMENTS

| | | | |
|---|---|---|---|
| 4,041,472 | 8/1977 | Shah et al. | 364/900 |
| 4,169,288 | 9/1979 | Fairman et al. | 364/900 |
| 4,257,095 | 3/1981 | Nadir | 364/200 |
| 4,320,452 | 3/1982 | Kemf et al. | 364/200 |
| 4,373,183 | 2/1983 | Means et al. | 364/200 |
| 4,384,322 | 5/1983 | Bruce et al. | 364/200 |
| 4,390,967 | 6/1983 | Eglowstein | 364/200 |
| 4,419,724 | 12/1983 | Branigin | 364/200 |
| 4,574,284 | 3/1986 | Feldman et al. | 340/825.52 |

OTHER PUBLICATIONS

Intel Multibus Specification, Intel Corporation, Order No. 9800683-04.

Primary Examiner—Raulfe B. Zache
Assistant Examiner—Agni Mohamed
Attorney, Agent, or Firm—Finnegan, Henderson, Farabow, Garrett and Dunner

[57] ABSTRACT

A plurality of data processor components are distributed along a plurality of intracommunication bus systems, each intracommunication bus system having an address bus and each being assigned a unique set of addresses, with at least one of the components associated with each of the intracommunication bus systems including an address signal generator for generating address signals over the address bus of the associated intracommunication bus system. An intercommunication bus system is utilized in combination with a plurality of link interface units, with each link interface unit connected between the intercommunication bus system and a corresponding one of the intracommunicaton bus systems, for carrying out communication of information over the intercommunication bus system between first and second of the intracommunication bus systems, in response to the address signals on the address bus of the corresponding one of the intercommunication bus systems. A related method is also provided.

3 Claims, 3 Drawing Sheets

LINKING INTERFACE SYSTEM USING PLURAL CONTROLLABLE BIDIRECTIONAL BUS PORTS FOR INTERCOMMUNICATION AMOUNG SPLIT-BUS INTRACOMMUNICATION SUBSYSTEMS

BACKGROUND OF THE INVENTION

I. Field of the Invention

This invention relates generally to a data processing system and related method, and more specifically to a system and related method for linking together a plurality of individual intracommunication bus systems to enable intercommunication therebetween.

II. Background Information

A simple data processing system generally includes a memory component, an input/output component, a processor component, and an intracommunication bus system along which the memory, input/output and processor components are distributed. This intracommunication bus system includes an address bus, a data bus and a control bus. The memory component stores information in addressable storage locations. The input/output component is employed to transfer information into and out of the data processing system over the intracommunication bus system. The processor component includes means for generating address signals over the address bus and control signals over the control bus of the intracommunication bus system and through utilization of these address and control signals causes information to be transmitted over the data bus of the intracommunication bus system between the processor component, memory component, and input/output component.

For example, with reference to the simple timing drawing of FIG. 1, at the start of a data transfer sequence an address signal is generated by the processor component over the address bus. This address signal identifies a particular location within the simple data processing system, for example, a particular memory location in the memory component or a particular input-output port. Simultaneous with or shortly after generation of the address signal, the processor component generates a read/write signal on the control bus which indicates whether a data word is to be read from or written into the location identified by the address signal on the address bus. If the control bus contains a read signal, data is to be read from the address signal location and inserted onto the data bus. If the control bus contains a write signal, data appearing on the data bus is to be written into the location identified by the address signal on the address bus.

After generation of the read/write signal on the control bus, and in response to that signal and in response to the address signal on the address bus, the corresponding data word read or write operation is undertaken. After completion of the read or write operation, a transfer complete signal is generated on the control bus indicating termination of the data transfer and the end of the data transfer sequence. In the case of a read operation, the transfer complete signal appears on the control bus after a data word has been read from the address corresponding to the address signal on the address bus and that data word has been inserted on the data bus. In the case of a write operation, the transfer complete signal is inserted on the control bus after the data word on the data bus has been written into the address location identified by the address signal on the address bus.

It should be understood that the data communication transfers referred to above with regard to FIG. 1 are greatly simplified and are presented by means of illustration and not limitation. Thus, in reality, a data processing system of the prior art may contain substantially more sophisticated control signals on the control bus than those indicated above in FIG. 1.

Data processing systems which utilize low cost microprocessors as the processor component are currently in demand because of the speed at which such systems are able to operate. Microprocessor-type data processing systems are known which have the capacity to communicate with one another, thereby forming a complex data processing system referred to as a multiprocessor system. In such a multiprocessor system, data stored in a memory component of one individual data processing system may be transferred to a second individual data processing system in order, for example, to allow parallel processing of the data. A transfer of data between two or more individual data processing systems requires an interconnecting architecture. In addition to the interconnecting architecture, a system arbitration is required for controlling the interconnection and to establish a priority between each individual data processor system.

In a typical multiprocessor system the interconnecting architecture includes a direct memory access (DMA) controller for each combination of individual data processing systems to be connected together. Each DMA controller includes an address generator and each DMA controller is assigned a unique address. When a first data processing system wishes to communicate with a second data processing system, a first processor component of the first data processing system employs data transfer related software in the first system to issue an address signal over the address bus of that system's intracommunication bus system, which address signal corresponds to the DMA controller that interconnects the first and second systems. After so addressing the appropriate DMA controller, the first processor component, again using the data transfer related software, sends data to that DMA controller over the data bus of that system, which data informs the DMA controller of the present address of the data to be transferred, the new address to which this data is to be transferred, and the number of words of data involved in the transfer. The DMA controller then uses this information and the DMA controller address generator to generate address signals for each system required to access and transfer between the two systems the block of data involved. After the transfer, the processor component of the recipient system accesses the data from the memory component of that system where the DMA controller stored that data.

Although this type of multiprocessor system is capable of interconnecting a plurality of separate data processing systems to establish communication between those data processing systems and, thereby, to provide extended memory capability, the operation of such multiprocessor system has proven to be slower than desired when small amounts of data are to be transferred. The processor component of any individual data processing system of the type described must use data transfer related software to access the DMA controller and thereby effect a data transfer. This software is often complex with numerous instruction sequences.

Accordingly, there exists a need for a multiprocessor system with increased data processing capabilities and extended memory capabilities, but which does not sacrifice the speed of system operation when small amounts of data are to be transferred. More specifically, there is a need for a multiprocessor system with an intercommunication scheme which does not require data transfer related software, but which can nevertheless easily access any memory location within the multiprocessor system, thereby meeting the speed requirements of multiprocessor systems while allowing for extended memory.

SUMMARY OF THE INVENTION

It is, accordingly, an object of the present invention to provide an apparatus and related method for interconnecting separate data processing systems of a multiprocessor system which provides for efficient communication between individual data processing systems, extended memory capabilities, and yet maintains high data processing speed.

Additional objects and advantages of the invention will be set forth in the description which follows or may be learned by practice of the invention.

To achieve the foregoing objects, and in accordance with the purpose of the invention as embodied and broadly described herein, there is provided a data processing system comprising: (a) a plurality of intracommunication bus systems, each having an address bus and each being assigned a unique set of addresses; (b) a plurality of data processor components distributed along the intracommunication bus systems, with at least one of the components associated with each of the intracommunication bus systems including an address signal generator for generating unique address signals over the address bus of the associated intracommunication bus system corresponding to the unique sets of addresses; (c) an intercommunication bus system; and (d) a plurality of link interface units, each connected between the intercommunication bus system and a corresponding one of the intracommunication bus systems, for carrying out communication of information over the intercommunication bus system between first and second of the intracommunication bus systems, in response to the unique address signals on the system bus of the corresponding one of the intracommunication bus systems.

Preferably, each link interface unit of the data processing system of the present invention includes a master control unit for controlling the communication in response to receipt of the address signals, with the master control unit including address decoder means for issuing a command signal in response to a received address signal which does not correspond to an address assigned to the corresponding intracommunication bus system from which that address signal was received. It is also preferable that each link interface unit of the subject invention further include a slave control unit for controlling the communication in response to a received command signal from another link interface unit, when that received command signal is indicative of an address signal included in the unique set of addresses assigned to the intracommunication bus system associated with that link interface unit.

In a preferred embodiment it is still further preferable that the intercommunication bus system and each of the intracommunication bus systems include a data bus, address bus, and control bus, and that each link interface unit further includes first, second and third bidirectional bus ports having forward conduction, reverse conduction and non-conduction states, these ports being connected respectively to corresponding data, address and control buses of the intercommunication and intracommunication bus systems to which the link interface unit is connected.

The method of the subject invention includes the steps of: (a) determining whenever an address signal appears from a first intracommunication system on the address bus of that first system which address signal does not correspond to any of the unique set of address signals assigned to the first system and generating, in response thereto, a first signal over the intercommunication bus indicative of the address signal; (b) detecting whenever a first signal on the intercommunication bus system corresponds to one of the unique set of addresses assigned to a second intracommunication bus system and generating, in response thereto, a second signal over the intercommunication bus system acknowledging that correspondence; and (c) communicating information over the intercommunication bus system, between the first and second intracommunication bus systems, in response to the first and second signals.

DESCRIPTION OF THE PREFERRED EMBODIMENT

Figure 2:
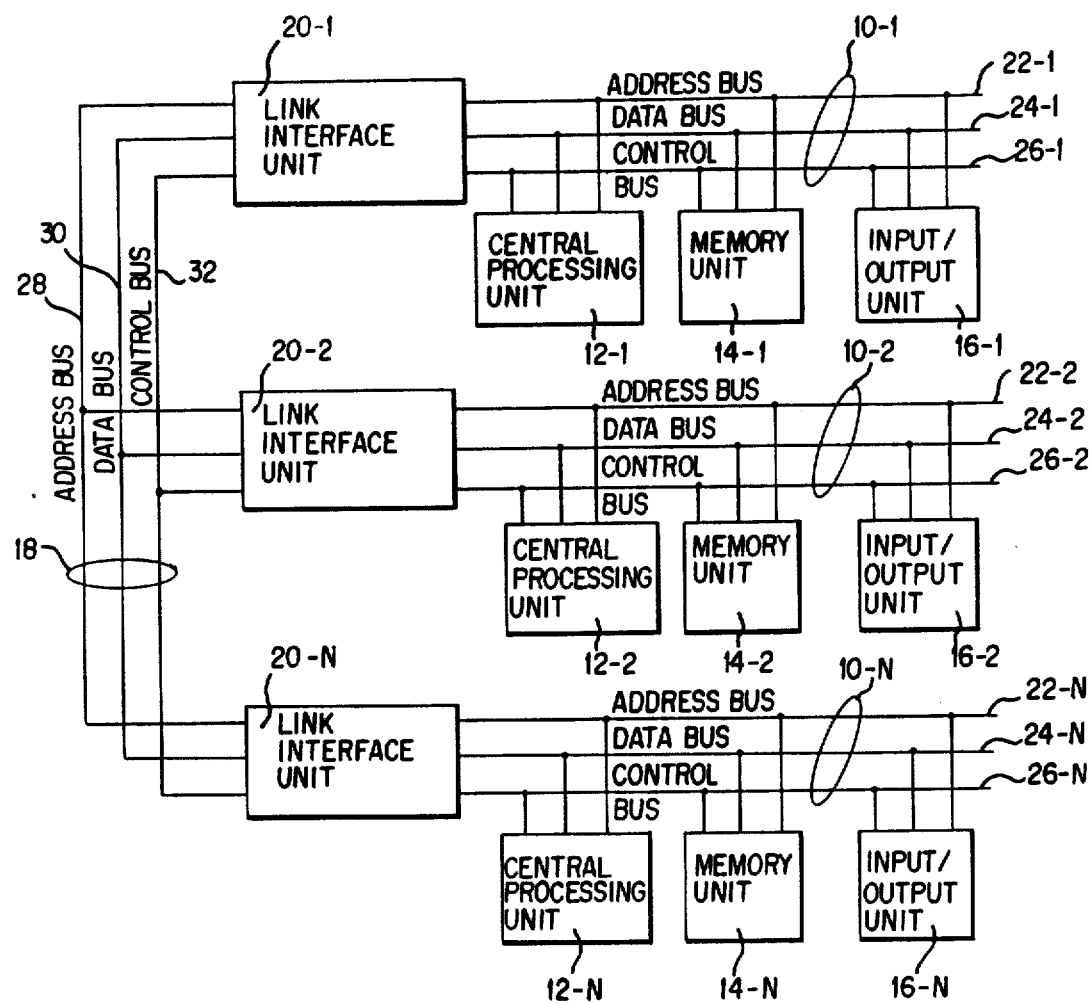
FIG. 2 is a general block diagram of a data processing system incorporating the teachings of the subject invention.

A data processing system is illustrated in FIG. 2 which includes a plurality of intracommunication bus systems 10-1, 10-2 and 10-N; a plurality of central processing units 12-1, 12-2 and 12-N; a plurality of memory units 14-1, 14-2 and 14-N; a plurality of input/output units 16-1, 16-2 and 16-N; an intercommunication bus system 18; and a plurality of link interface units 20-1, 20-2 and 20-N.

Central processing units 12-1, 12-2, 12-N; memory units 14-1, 14-2, 14-N; and input/output units 16-1, 16-2 and 16-N comprise a plurality of data processor components distributed along respective intracommunication bus systems 10-1, 10-2, 10-N.

Intracommunication bus system 10-1 is connected to intercommunication bus system 18 by link interface unit 20-1; intracommunication bus system 10-2 is connected to intercommunication bus system 18 by link interface unit 20-2; and intracommunication bus system 10-N is connected to intercommunication bus system 18 by link interface unit 20-N.

Intracommunication bus systems 10-1, 10-2, 10-N each include corresponding address buses 22-1, 22-2, 22-N; data buses 24-1, 24-2, 24-N; and control buses 26-1, 26-2, 26-N. Each of intracommunication bus systems 10-1, 10-2, 10-N has assigned to it a unique set of addresses. For example, intracommunication bus system 10-1 may be assigned addresses within the range of 00000H to 1FFFFFH; intracommunication bus system 10-2 may be assigned addresses within the range of 20000H to 3FFFFFH; and intracommunication bus system 10-N may be assigned addresses within the range of 40000H to 5FFFFFH.

Central processing units 12-1, 12-2, 12-N each include means for generating, over respective address buses 22-1, 22-2, 22-N of the associated intracommunication bus systems 10-1, 10-2, 10-N, any of the address signals assigned to any of the intracommunication bus systems.

Each intracommunication bus system 10-1, 10-2, 10-N, may be assigned the performance of a specific function through operation of corresponding central processing units 12-1, 12-2, 12-N. Thus, each intracommunication bus system 10-1, 10-2, 10-N may be called upon by another bus system or itself may request another bus system to perform the specific function to which that intracommunication bus system has been dedicated. Each individual intracommunication bus system 10-1, 10-2, 10-N may be configured to be different from the others so that the overall system may be tailored by a combination of these individual intracommunication bus systems whose functions collectively meet the criteria demanded by the user.

Intercommunication bus system 18 comprises address bus 28, data bus 30, and control bus 32.

Link interface units 20-1, 20-2, 20-N in combination with intercommunication bus system 18 allow communication between any two intracommunication bus systems 10-1, 10-2, 10-N. This communication of information is critical to permit each of the individual intracommunication bus systems to perform their intended individual functions. Thus, information communication must be readily accessible to and from the various intracommunication bus systems to enable the overall system to perform all transactions to which the system has been designed.

In the exemplary illustration of FIG. 2, bus system 10-1 may function as a system manager of the overall data processing system, while bus system 10-2 functions as a CPU manager which deals with processing intensive tasks such as corrections, Fast Fourier Transformation or some imaging reconstruction, and bus system 10-N functions as a memory manager which deals with input/output functions, data acquisition, display and storage.

In accordance with the present invention, there is provided a plurality of link interface means, each connected between the intercommunication bus system of the subject invention and a corresponding one of a plurality of intracommunication bus systems, for carrying out communication of information over the intercommunication bus system between first and second of the intracommunication bus systems, in response to unique address signals on the address bus of the corresponding one of the intracommunication bus systems.

As is illustratively shown in FIG. 2, the preferred embodiment of the subject invention includes link interface units 20-1, 20-2, and 20-N. These link interface units allow communication between any two intracommunication bus systems 10-1, 10-2, 10-N. Specifically, each link interface unit 20-1, 20-2, 20-N monitors the respective intracommunication bus systems 10-1, 10-2, 10-N and the intercommunication bus system 18. As will be discussed in greater detail below, each link interface unit 20-1, 20-2, 20-N achieves communication between a corresponding intracommunication bus 10-1, 10-2, 10-N over intercommunication bus system 18 in a manner which is completely software transparent, i.e., invisible to the software employed in each central processing unit 12-1, 12-2, 12-N. Each central processing unit, in effect, does not realize that communication is occurring with an unrelated intracommunication bus system.

To achieve this software transparent intercommunication, each intracommunication bus system is assigned a unique set of addresses as referred to above. In addition, each link interface unit 20-1, 20-2, 20-N includes a master control means for controlling the communication in response to receipt of an address signal on the address bus of a corresponding intracommunication bus system. Specifically, each master control means includes address decoder means for issuing a command signal in response to a received address signal which does not correspond to an address assigned to the intracommunication bus system from which that address signal was received. This command signal is indicative of this received address signal. In addition, each link interface means includes slave control means for controlling that communication in response to a received command signal from another link interface means when the received command signal is indicative of an address signal included in the unique set of addresses assigned to the intracommunication bus system associated with that particular link interface means.

Figure 3:
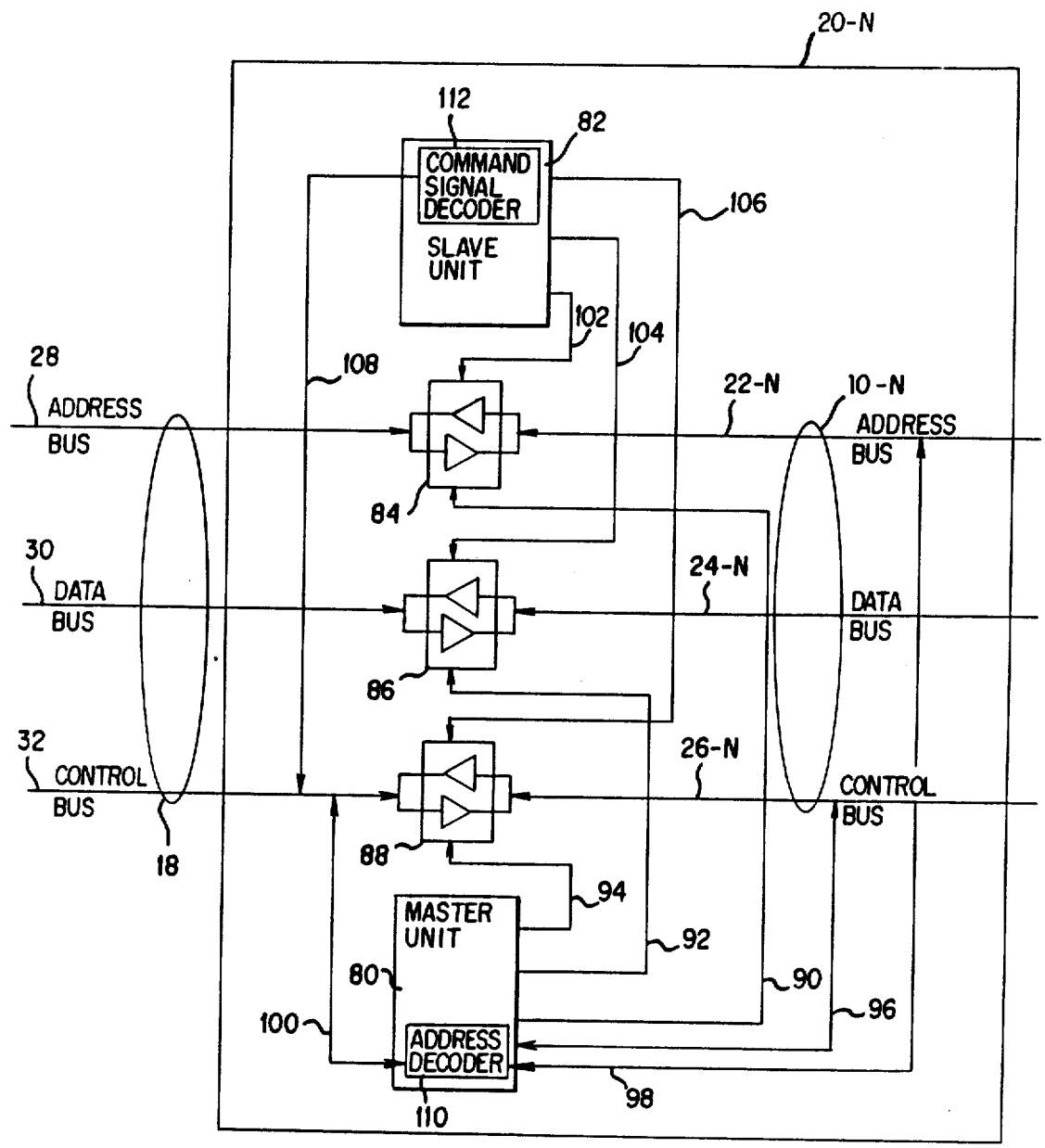
FIG. 3 is a more detailed schematic block diagram of the bus link interface of FIG. 2.

A representative link interface unit 20-N is shown in more detail in FIG. 3. In FIG. 3, link interface unit 20-N is shown to comprise master unit 80, slave unit 82, and first, second and third bidirectional ports 84, 86 and 88. Port 84 is connected between address bus 22-N of intracommunication bus system 10-N and address bus 28 of intercommunication bus 18. Port 86 is connected between data bus 24-N of intracommunication bus system 10-N and data bus 30 of intercommunication bus system 18. Port 88 is connected between control bus 26-N of intracommunication bus system 10-N and control bus 32 of intercommunication bus system 18. Ports 84, 86 and 88 each have forward conduction, reverse conduction and non-conduction states as are well-known to those skilled in the bidirectional port art.

Master unit 80 is connected to ports 84, 86 and 88 by lines 90, 92 and 94, respectively. In addition, master unit 80 is connected to control bus 26-N by line 96, to address bus 22-N by line 98, and to control bus 32 by line 100. Slave unit 82 is connected to ports 84, 86 and 88 by lines 102, 104, and 106, respectively. In addition, slave unit 82 is connected to control bus 32 of intercommunication system 18 by line 108.

Master unit 80 and slave unit 82 are, in effect, logic controllers which select the direction of operation of bidirectional ports 84, 86 and 88 in response to address and command signals appearing on address bus 22-N, control bus 26-N, and control bus 32. Specifically, master unit 80 includes an address decoder 110 which is connected by line 89 to address bus 22-N. Address decoder 110 operates to continuously monitor address bus 22-N to determine if address signals contained thereon do not in fact correspond to an address assigned to the corresponding intracommunication bus system 10-N from which those address signals are received. In response to detection of such a non-corresponding address signal on address bus 22-N, address decoder 110 operates in conjunction with master unit 80 to generate a command signal over line 100 onto control bus 32 of intercommunication bus system 18.

This command signal indicates to all other link interface units connected to intercommunication bus system 18 that one of the link interface units connected to intercommunication bus system 18 is attempting to communicate with another of those units. The command signal includes data indicative of the address signal which was detected by address decoder 110 not to correspond to the addresses assigned to the corresponding intracommunication bus system. Thus, the other link interface units connected to intercommunication bus 18 can simply compare that command signal to determine whether they are connected to an intracommunication bus system with which that address signal does correspond.

To undertake this determination, slave unit 82 of each link interface unit continuously monitors control bus 32 of intercommunication bus system 18. Thus, any command signal appearing on control bus 32 is communicated to slave unit 82 by line 108. Slave unit 82 includes a command signal decoder 112 which operates to determine if a received command signal corresponds to an address assigned to the intracommunication bus system corresponding to that slave unit. If correspondence is found, an enable signal is generated by slave unit 82 over line 108 and onto control bus 32.

This enable signal is received by all link interface units connected to intercommunication bus system 18. All these link interface units will ignore this enable signal except for that one link interface unit from which the command signal which initiated generation of that enable signal was sent. In this link interface unit, master unit 80 detects the existence of the enable signal over control bus 32 and in response to that detection issues command signals over lines 90 and 94 to address port 84 and control port 88, respectively. These control signals operate to open address port 84 in a right to left direction as shown in FIG. 3 and to likewise open control port 88 in a right to left direction as shown in FIG. 3. Upon so opening address port 84 and control port 88, the address signal on bus 22-N and any corresponding control signal on control bus 26-N is permitted to pass through ports 84 and 88, respectively, and onto address bus 28 and control bus 32 of intercommunication bus system 18.

In the link interface unit which generated the enable signal, slave unit 82, upon generation of the enable signal, likewise generates control signals over lines 102 and 106 to operate address port 84 and control port 88 in that respective link interface unit. These control signals are effective to activate address port 84 and control port 88 in a left to right direction as shown in FIG. 3 thereby permitting the address signal on address bus 28 to pass through port 84 and enter the address bus of the corresponding intracommunication bus system. Likewise, the control signal on line 106 operates to permit control port 88 to pass control signals on intercommunication control bus 32 through control port 88 to the control bus of that corresponding intracommunication bus system.

If, for example, intracommunication bus system 10-1 initiated the command signal and intracommunication bus system 10-N issued the enable signal, the above-described closure of ports 84 and 88 in the corresponding link interface units 20-1 and 20-N would result in address signals from address bus 22-1 to be passed through port 84 of link interface unit 20-1 over address bus 28 through port 84 of link interface unit 20-N and over address bus 22-N. Likewise, control signals would pass from bus 26-1 through link interface unit 20-1 over control bus 32 of intercommunication bus system 18 through link interface unit 20-N and onto control bus 26-N.

All that is left to effect communication of data between intracommunication bus system 10-1 and intracommunication bus system 10-N is to determine the direction of that data transfer. If data is to be written from system 10-1 to system 10-N, this will be indicated by the nature of a write control signal first appearing on control bus 26-1 and will be detected by master unit 80 of link interface unit 20-1 to generate a control signal over line 92 to open port 86 from a right to left direction to permit a corresponding data word on data bus 24-1 to pass through port 86 of link interface unit 20-1 and onto data bus 30.

Likewise, slave unit 82 of link interface unit 20-N, having received the write signal from intracommunication bus system 10-1 over control bus 32 of intercommunication bus system 18 and line 108, operates to generate an appropriate control signal over line 104 to data port 86 of link interface unit 20-N to open that port 86 in a left to right direction as shown in FIG. 3 permitting the data word from intracommunication bus system 10-1 to pass from intercommunication data bus 30, through port 86 and onto data bus 24-N.

Intracommunication bus system 10-N therefore receives the requisite address signals, data word and control signals to effect writing in the processor component of intracommunication bus system 10-N assigned that corresponding address without any software intervention of central processing unit 12-1 or 12-N.

For a read communication operation, a read signal will appear on control bus 26-1 of intracommunication bus system 10-1 and this read signal is interpreted by master unit 80 to close data bus 86 of link interface unit 20-1 in a left to right direction as shown in FIG. 3. Likewise, this same read signal when detected by link interface unit 20-N will cause the slave unit 82 of that link interface unit to close data port 86 of that link interface unit in a right to left direction as shown in FIG. 3, thereby permitting reading of a corresponding data word on data bus 24-N, through port 86 of link interface unit 20-N, over data bus 30 of intercommunication bus system 18, through data port 86 of link interface unit 20-N, and onto data bus 24-1 of intracommunication bus system 10-1.

Figure 1:
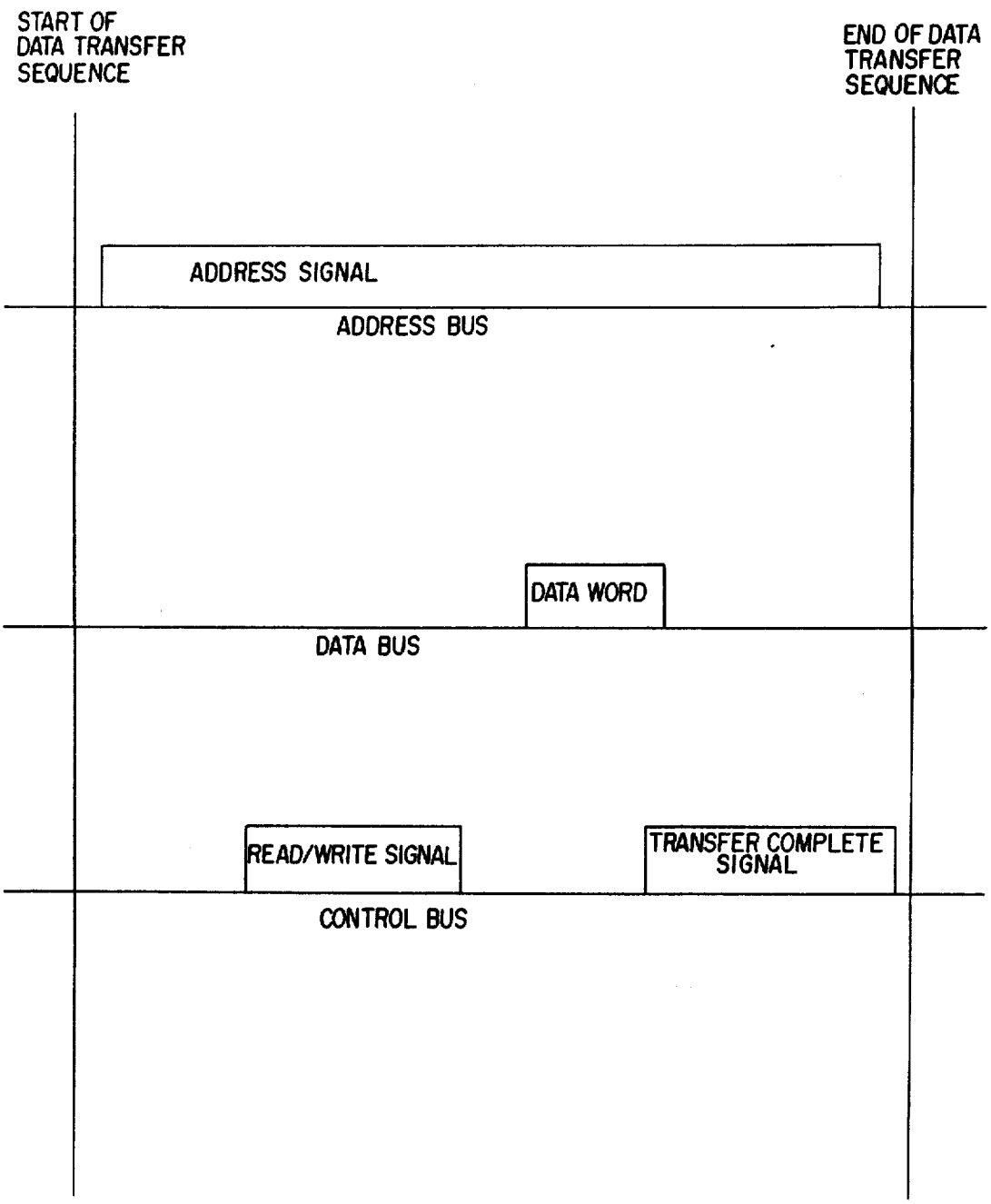
FIG. 1 is a timing diagram of a prior art data processing system.

Upon completion of a data transfer operation, a transfer complete signal is generated over the control bus of the intracommunication bus system completing the transfer as was discussed above with regard to FIG. 1. This transfer complete signal is passed between the intercommunicating link interface units as a consequence of the above-indicated closures of control ports 88 in the link interface units involved. For example, upon completion of either a read or write operation initiated by intracommunication control system 10-1 involving intracommunication control system 10-N, a corresponding transfer complete signal will appear on control bus 26-N. This transfer complete signal will be communicated through control port 88 of link interface unit 20-N, over control bus 32, through port 88 of link interface unit 20-1 and onto control bus 26-1. The completion of this transfer is detected by central processing unit 12-1, and in response to this detection central processing unit 12-1 removes address signals from address bus 22-1 and control signals from control bus 26-1. As a consequence, the master unit 80 of link interface unit 20-1 removes the request signal from line 100 and causes ports 84, 86 and 88 to be rendered non-conductive. In addition master unit 80 of link interface unit 20-N, upon loss of the request signal from link interface unit 20-1, causes ports 84, 86 and 88 of link interface unit 20-N also to be rendered non-conductive. Thus, both link interface unit 20-1 and link interface 20-N are ready for the next communication operation.

As should be appreciated from the foregoing description, a complete bus link process between any two intracommunication bus systems is transparent to the software of those intracommunication bus systems and exposes those systems to only a transfer overhead of intracommunication bus systems arbitration time.

If, during a read/write transfer, an interrupt signal is received by a particular bus link interface 20-1, 20-2, 20-N, this condition indicates that another intracommunication bus system requires attention by that link interface unit. Priority of attention may be determined by priority of the request. If the interrupt priority level exceeds the interface unit's current operating level, the interface unit acknowledges the interrupt having the highest priority and executes a standard interrupt service routine to service that interrupt. Thus, the efficiency of bus use and speed of data processing may be maintained high, and ease of code and hardware debugging is expedited.

In view of the foregoing, it should be understood that in addition to a data processing system, a method has also been disclosed for selectively interconnecting a plurality of intracommunication bus systems each having an address bus and each being assigned a unique set of addresses, through utilization of an intercommunication bus system. This method, in its generic form, may be said to comprise the steps of: (a) detecting whenever an address signal appears from a first intracommunication bus system, for example, from intracommunication bus system 10-1, on an address bus of that first system, for example, address bus 22-1, which address signal does not correspond to any of the unique set of address signals assigned to that first signal, and for generating, in response thereto, a first signal, for example, a command signal generated by master unit 80 of link interface unit 20-1, over the intercommunication bus system, for example, intercommunication bus system 18, indicative of that address signal. A second step of this generic method comprises detecting whenever the first signal, such as the command signal, on the intercommunication bus system corresponds to one of the unique set of addresses assigned to a second intracommunication bus system, such as intracommunication bus system 10-N, and generating, in response thereto, a second signal over the intercommunication bus system, for example, an enable signal generated by slave unit 82 of link interface unit 20-N over control bus 32, acknowledging that correspondence. A final step of this generic method comprises communicating information, such as a single address, related data word and control signal, over the intercommunication bus system, for example, intercommunication bus system 18, between the first and second intracommunication bus systems, for example, intracommunication bus systems 10-1 and 10-N, in response to the first and second signals, for example, in response to the command signal and acknowledgement signals which, as described above, cause selective operation of ports 84, 86 and 88 of link interface units 20-1 and 20-N.

Thus, the intercommunication scheme of the subject invention does not require data transfer related software, but nevertheless provides for easy access of any memory location within a multiprocessor system. This scheme is particularly useful for intercommunication of small amounts of data and might even be used in conjunction with a DMA controller dedicated to the intercommunication of large amounts of data.

It should be apparent to those skilled in the art that various modifications and variations may be made to the data processing system and related method of the present invention without departing from the scope or spirit of the invention. Thus, it is intended that the invention cover modifications and variations of the invention, provided they come within the scope of the appended claims and their legally entitled equivalents.

I claim:

1. A data processing system comprising:
   a plurality of intracommunication bus systems, each having an address bus, a data bus, and a control bus, each address bus being assigned a unique set of addresses;
   a plurality of data processor components, at least one of said plurality of data processor components being connected to each of said plurality of intracommunication bus systems, having means for generating address signals over said address buses for requesting communication with any other one of said plurality of intracommunication bus systems, each of said generated address signals corresponding to one of said unique sets of addresses corresponding to a respective one of the other of the plurality of intracommunication bus systems;
   an intercommunication bus system having an address bus, a data bus, and a control bus, common to said plurality of intracommunication bus systems; and
   each of said plurality of intracommunication bus systems including a link interface means having first, second, and third bidirectional ports, each port having forward conduction, reverse conduction and non-conduction states, said ports connected respectively to corresponding data, address and control buses of said intercommunication and intracommunication bus systems to which said link interface means is connected,
   each said link interface means including:
      master control means having first controller means for selectively operating said first, second and third ports to pass address signals, data signals, and control signals through said first, second and third ports, respectively, for electrically connecting a selected one of the plurality of intracommunication bus systems to said intercommunication system in response to receipt of said address signals, said master control means including address decoder means for issuing a command signal in response to a received address signal which does not correspond to an address assigned to said corresponding intracommunication bus system from which said address signal was received, said command signal being indicative of said received address signal said first controller means including means for selecting the direction of operation of said first and third ports in response to generation of said command signal by said address decoder of the same link interface means, and means for selecting the direction of operation of said second port in response to control signals received from said control bus of said corresponding intracommunication bus system; and
      slave control means having second controller means for selectively operating said first, second and third ports to pass said address signals, data signals, and control signals through said first, second and third ports, respectively, for electrically connecting a selected one of the plurality of intracommunication bus systems to said intercommunication system in response to a received command signal from another link interface means when said received command signal is indicative of an address included in the unique set of addresses assigned to the intracommunication bus system associated with said link interface means.

2. A data processing system of claim 1 wherein each said second controller includes means for selecting the direction of operation of said first and third ports in response to receipt of said command signal from another link interface means and each said second controller further includes means for selecting the direction of operation of said second port in response to control signals received from said another link interface over said control bus of said intercommunication bus system.

3. A data processing system of claim 2 wherein each said first and second controller means include means for rendering said first, second and third ports non-conductive in response to removal of said address signals on the address bus of an intracommunication bus system.

* * * * *